United States Patent [19]

Noll et al.

[11] Patent Number: 4,576,989

[45] Date of Patent: Mar. 18, 1986

[54] AQUEOUS SOLUTIONS OR DISPERSIONS OF CATIONIC OLIGO-URETHANES, A PROCESS FOR THE PRODUCTION THEREOF AND THE USE THEREOF TO PRODUCE COATINGS

[75] Inventors: Klaus Noll, Cologne, Fed. Rep. of Germany; Terry Potter, New Martinsville, W. Va.; Josef Pedain, Cologne; Jürgen Schwindt, Leverkusen, both of Fed. Rep. of Germany

[73] Assignee: Bayer Aktiengesellschaft, Leverkusen, Fed. Rep. of Germany

[21] Appl. No.: 701,710

[22] Filed: Feb. 14, 1985

[30] Foreign Application Priority Data

Feb. 27, 1984 [DE] Fed. Rep. of Germany ....... 3406998

[51] Int. Cl.$^4$ ............................................... C08L 75/04
[52] U.S. Cl. ................................. 524/591; 427/385.5; 427/388.2; 427/388.4; 524/874
[58] Field of Search .................. 524/591, 874; 204/40, 204/48; 427/385.5, 388.2, 388.4

[56] References Cited

U.S. PATENT DOCUMENTS

| | | | |
|---|---|---|---|
| 3,307,948 | 3/1967 | Thiens et al. | 528/85 |
| 3,567,692 | 3/1971 | Haggis et al. | 260/75 |
| 3,621,000 | 11/1971 | Schmelzer et al. | 260/77.5 AM |
| 3,726,838 | 4/1973 | Eimer et al. | 528/85 |
| 4,239,878 | 12/1980 | Kobayashi et al. | 528/45 |
| 4,285,789 | 8/1981 | Kobayaski et al. | 204/181 C |

*Primary Examiner*—Maurice J. Welsh
*Attorney, Agent, or Firm*—Gene Harsh; Joseph C. Gil; Thomas W. Roy

[57] ABSTRACT

The present invention is directed to aqueous solutions or dispersions which may contain blocked polyisocyanates of cationic oligourethanes which are crosslinkable at elevated temperature and contain (a) about 0.1 to 3% by weight of ternary or quaternary ammonium ions introduced through Michael adducts of secondary amines having at least one hydroxyl group and specific acrylic acid derivatives, (b) up to about 2.8% by weight of tert. amino nitrogen atoms incorporated through Michael adducts of secondary amines having at least one hydroxyl group and specific acrylic acid derivatives and (c) about 0 to 15% by weight of blocked isocyanate groups, provided that the ternary ammonium groups of (a), the tert. nitrogen atoms of (b) and the blocked isocyanate groups are present in an equivalent ratio of (a+b):blocked isocyanate groups of about 1:1 to 1:1.5. The present invention is additionally directed to a process for the preparation of these solutions or dispersions of oligourethanes and to their use for coating heat resistant substrates, particularly by coating metallic substrates by cathodic electrodeposition and subsequently crosslinking these coatings at elevated temperature.

9 Claims, No Drawings

AQUEOUS SOLUTIONS OR DISPERSIONS OF CATIONIC OLIGO-URETHANES, A PROCESS FOR THE PRODUCTION THEREOF AND THE USE THEREOF TO PRODUCE COATINGS

BACKGROUND OF THE INVENTION

1. Field of the Invention

The present invention relates to aqueous solutions or dispersions of cross-linkable, cationic polyurethanes having reversibly blocked amino groups incorporated via urethane groups which may react with blocked isocyanate groups in the heat, to a process for the production of these solutions or dispersions and to the use thereof for the production of coatings on heat-resistant substrates and in particular on metals by cathodic separation.

2. Description of the Prior Art

Reaction constituents having reversibly blocked amino groups for organic polyisocyanates having optionally blocked isocyanate groups are already known. DE-AS No. 1,520,139, for example, describes heat cross-linkable two-component systems which harden to produce polyureas, in which one component contains free isocyanate groups and the other component contains reversibly blocked amino groups in the form of aldimine or ketimine groups. DE-AS No. 1,694,237 describes heat cross-linkable combinations of NCO-prepolymers having phenol-blocked isocyanate groups and aliphatic or aromatic compounds having ketamine and/or enamine groups.

It has now surprisingly been found that certain tert. amines (which are produced by the Michael addition of secondary amines to specific acrylic acid derivatives) are, on the one hand, masked secondary amines which do not react at room temperature with polyisocyanates having blocked isocyanate groups and react with them at a moderately elevated temperature of about 90° to 130° C. with the production of urea. On the other hand they may be converted into quaternary and more particularly ternary ammonium groups using quaternizing agents and particularly organic or inorganic acids. The oligourethanes having masked isocyanate groups and quaternary and more particularly ternary ammonium groups of the above type represent self cross-linkable binders which may be dissolved or dispersed in water for coating agents which are processed from the aqueous phase and may be particularly applied to metallic substrates by cathodic deposition. Oligourethanes having quaternary and more particularly ternary ammonium groups of the above type represent cross-linkable binders when combined with blocked polyisocyanates. Such combinations may also be dissolved or dispersed in water for coating agents which are processed from the aqueous phase.

SUMMARY OF THE INVENTION

The present invention is directed to aqueous solutions or dispersions of cationic oligourethanes which are cross-linkable at elevated temperature and which solutions or dispersions optionally contain blocked polyisocyanates, characterized in that the oligourethanes have (a) a ternary or quaternary ammmonium ion content (calculated as nitrogen, atomic weight=14) in the form of structural units which are incorporated via urethane groups terminally, and/or within the molecule corresponding to the formula

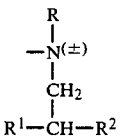

of about 0.1 to 3% by weight, and

R represents hydrogen or an aliphatic, cycloaliphatic or araliphatic radical, as is fixed to the tert. nitrogen atom during the quaternization of tert. nitrogen atoms using alkylating, cycloalkylating or aralkylating agents, $R^1$ represents hydrogen or an alkyl radical having from 1 to 4 carbon atoms, $R^2$ represents $-C\equiv N$, $-CO-NH_2$, $-CO-NHR^3$, $-CO-NR_2^3$ or $-COOR^3$ and $R^3$ represents a monovalent hydrocarbon radical which may have inert substituents, (b) a tert. amino nitrogen atom content (atomic weight=14) in the form of structural units which are incorporated terminally via urethane groups, and/or within the molecule, corresponding to the formula

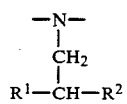

of up to about 2.8% by weight, and $R^1$ and $R^2$ are as defined above and (c) a blocked isocyanate group content (calculated as NCO) of about 0 to 15% by weight, provided that the ternary ammonium groups of (a), the tert. nitrogen atoms of (b) and the blocked isocyanate groups both incorporated into the oligourethane and being a part of the blocked polyisocyanate optionally present in the solution or dispersion are present in an equivalent ratio of (a+b):blocked isocyanate groups of about 1:1 to 1:1.5.

A further object of the present invention is a process for the production of the said solutions or dispersions, which is characterized in that (i) an organic polyisocyanate which may have urethane groups, the isocyanate groups of which polyisocyanate may be partially present in blocked form, are reacted with compounds corresponding to the formula

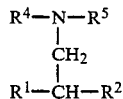

wherein $R^1$ and $R^2$ are as defined above and $R^4$ and $R^5$ are the same or different and represent hydrocarbon radicals having from 1 to 20 carbon atoms or hydrocarbon radicals having from 2 to 20 carbon atoms which have at least one alcoholic hydroxyl group as a substituent, on condition that at least one of the radicals $R^4$ or $R^5$ has at least one alcoholic hydroxyl group, while maintaining an equivalent ratio of free isocyanate groups to hydroxyl groups of about 0.7:1 to 2.5:1 with the formation of urethane, (ii) the tert. amino nitrogen atoms of the oligourethanes which are obtained in this manner are at least partially converted into ternary or quaternary ammonium groups by neutralization with an acid or by quaternization with a quaternizing agent and
(iii) the cationic oligourethanes which are obtained in this manner are dissolved or dispersed in an aqueous medium, an organic polyisocyanate having blocked isocyanate groups being optionally added to the aqueous solution or dispersion during or after its production.

A further object of the present invention is also the use of the aqueous solutions or dispersions according to the present invention for the production of coatings on heat-resistant substrates, characterized in that the aqueous solutions or dispersions which may contain auxiliaries and additives from lacquer technology are applied to the substrates and the coatings which are thus obtained are hardened by heating to up to about 160° C. with evaporation of the water and the solvent which may be present and with heat cross-linking of the binder.

DETAILED DESCRIPTION OF THE INVENTION

The compounds corresponding to the formula

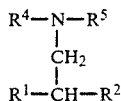

which are used according to the present process are Michael adducts of secondary amines corresponding to the formula

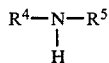

and compounds corresponding to the formula

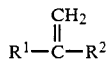

which may be formally regarded as derivatives of acrylic acid or substituted acrylic acids.

The secondary amines of the above-mentioned general formula are secondary amines in which $R^4$ and $R^5$ are as defined above and preferably secondary amines in which $R^4$ and $R^5$ are the same or different radicals and represent alkyl groups having from 1 to 18 carbon atoms, preferably from 1 to 4 carbon atoms, or hydroxyalkyl radicals having from 2 to 4 carbon atoms and at least one hydroxyl substituent, provided that at least one of the radicals $R^4$ or $R^5$ is a hydroxyalkyl radical. The following are examples of suitable secondary amines which correspond to this definition: methyl-2-hydroxy-ethylamine, methyl-2-hydroxypropyl amine, methyl-3-hydroxypropyl amine, ethyl-, butyl-, octyl- and stearyl-ω-hydroxyalkyl amines, bis-(2-hydroxyethyl) amine, bis-(2-hydroxypropyl)amine, bis-(3-hydroxy-propyl)amine or 2-(methyl-, ethyl-, butyl-, oleyl- or stearyl-amino)-2-methylpropanediol-1,3.

Suitable unsaturated compounds of the latter-mentioned formula are any compounds in which $R^1$ and $R^2$ are as defined above, but preferably compounds corresponding to the above general formula wherein $R^1$ represents hydrogen or a methyl group, $R^2$ is as defined above and $R^3$ represents an alkyl radical having from 1 to 4 carbon atoms. Particularly preferred compounds corresponding to the latter-mentioned formula are those in which $R^1$ represents hydrogen or a methyl group and $R^2$ represents a nitrile group or an acid amide group which may be substituted.

The derivatives of acrylic acid and substituted acrylic acids respectively which are particularly preferred thus include acrylonitrile, methacrylonitrile acrylic acid amide, methacrylic acid amide, N-methyl-acrylic acid amide, N-methyl-methacrylic acid amide, N-butyl-acrylic acid amide, N,N-dimethyl-acrylic acid amide or N.N-dimethyl-methacrylic acid amide. The esters of the above acids, such as acrylic acid-methyl esters, -ethylesters, -butylesters or -stearylesters, and the corresponding alkacrylic acid esters are also suitable, albeit less preferred, as the reaction thereof with the secondary amines to produce the suitable starting materials according to the present invention does not run as smoothly as when the above preferred starting materials are used. For this reason, by way of comparison, higher temperature, strongly alkaline catalysts and excess quantities of the unsaturated compounds have to be used, which then have to be removed by distillation.

The starting compounds corresponding to the formula

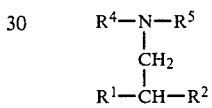

which are essential to the present invention are produced in known manner from the above-mentioned basic materials (c.f., Chem. Pharm. Bull (Tokyo) 9, (1961), pages 996–999 or DE-OS 2,519,008). It generally suffices to mix the two reaction constituents in a stoichiometric quantity at room temperature and to keep the exothermic reaction under control, for example, by cooling.

The starting materials corresponding to the latter-mentioned general formula which are obtained in this manner correspond to the above information, with regard to the radicals $R^1$, $R^2$, $R^4$ and $R^5$.

Reaction constituents for the tert. amines of the latter-mentioned general formula which have hydroxyl groups are any organic polyisocyanates having optionally partially blocked isocyanate groups.

Suitable polyisocyanates include aliphatic, cycloaliphatic, araliphatic, aromatic and heterocyclic polyisocyanates such as those described by W. Siefken in Justus Liebigs Annalen der Chemie, 562, pages 75 to 136, for example, polyisocyanates corresponding to the formula

wherein
n is from 2 to 4, preferably 2, and
Q represents an aliphatic hydrocarbon radical having from 2 to 18, preferably from 6 to 10, carbon atoms; a cycloaliphatic hydrocarbon radical having from 4 to 15, preferably from 5 to 10, carbon atoms; an aromatic hydrocarbon radical having from 6 to 15, preferably from 6 to 13, carbon atoms; or an araliphatic hydrocarbon radical having from 8 to 15, preferably from 8 to 13, carbon atoms. Specific examples include ethylene-diisocyanate, 1,4-tetramethylene-diisocyanate, 1,6-hexamethylene diisocyanate, 1,12-dodecane-diisocyanate, cyclobutane-1,3-diisocyanate, cyclohexane-1,3- and -1,4-diisocyanate and mixtures of these isomers, 1-isocyanato-3,3,5-trimethyl-5-isocyanatomethylcyclohexane (isophorone diisocyanate), perhydro-2,4'- and/or -4,4'-diphenylmethane-diisocyanate, 2,4- and 2,6-toluylene diisocyanate and any mixtures of these isomers, diphenylmethane-2,4'- and/or -4,4'-diisocyanate and naphthylene-1,5-diisocyanate.

The following may also be used according to the present invention: triphenylmethane-4,4', 4"-triisocyanate; polyphenyl-polymethylene polyisocyanates obtained by aniline-formaldehyde condensation and subsequent phosgenation as described in British Pat. Nos. 874,430 and 848,671; polyisocyanates having carbodiimide groups as described in German Pat. No. 994,890, Belgium Pat. No. 716,626 and Dutch Patent Application No. 7,102,524; polyisocyanates having isocyanurate groups as described in U.S. Pat. No. 3,001,973; German Pat. Nos. 1,022,789, 1,222,067 and 1,027,394 and DE-Offenlegungsschriften Nos. 1,929,034 and 2,004,048; or polyisocyanates having biuret groups as described in U.S. Pat. Nos. 3,124,605, and 3,201,372 and in British Pat. No. 889,050. It is also possible to use mixtures of the above-mentioned polyisocyanates.

Polyisocyanate prepolymers are most preferably used as the organic polyisocyanates and are obtained in known manner by reacting monomeric polyisocyanates with excess quantities of compounds having isocyanate-reactive groups, preferably hydroxyl groups. Polyisocyanates which may be commercially obtained without difficulty and in particular the known diisocyanates of polyurethane chemistry are preferably used to produce these NCO-prepolymers. The following are examples thereof: 2,4- and 2,6-toluylenediisocyanate and the commerical mixtures thereof, diphenylmethane-2,4'- and -4,4'-diisocyanate and the commerical mixtures thereof, isophorone diisocyanate and perhydro-4,4'-diphenylmethane diisocyanate.

Reaction constituents for these diisocyanates in the production of the NCO-prepolymers are organic compounds which have at least two isocyanate-reactive hydrogen atoms and which are otherwise inert with respect to the isocyanate addition reaction. Suitable polyhydroxyl compounds are those having from 2 to 8, preferably from 2 to 3, alcoholic hydroxyl groups. These compounds have a molecular weight of from 62 to about 10,000 and preferably from about 500 to 6,000. Examples of suitable polyhydroxyl compounds are:

(a) polyhydric alcohols optionally having ether groups and a molecular weight of 62 to 400 such as ethylene glycol, propylene glycol, 1,2-, 1,3- and 1,4-dihydroxybutane, 1,6-dihydroxyhexane, diethylene glycol, triethylene glycol, dipropylene glycol, tripropylene glycol, tetrapropylene glycol, trimethylol propane or glycerine;

(b) relatively high molecular weight polyester polyols having a molecular weight of 400 to about 10,000, preferably about 500 to 6,000, which are based on the above polyhydric alcohols and polybasic carboxylic acids and anhydrides of the acids such as adipic acid, phthalic acid, tetrahydrophthalic acid, hexahydrophthalic acid or the corresponding acid anhydrides;

(c) relatively high molecular weight polyether polyols having a molecular weight of 400 to about 10,000, preferably about 500 to 6,000, such as the alkoxylation products of the polyhydric alcohols mentioned in (a) or other suitable starting molecules (for example, bisphenols such as bisphenol A) which are produced using ethylene oxide and/or propylene oxide as the alkoxylating agent and wherein mixtures of various starting molecules may be used.

Of course any mixtures of the compounds mentioned by way of example in (a) to (c) may be used in the production of the NCO-prepolymers. Polythioethers, polyacetals, polycarbonates or polyester amides which are known from polyurethane chemistry may also be used to produce the NCO-prepolymers.

If desired, hydrophilic structural constituents may be additionally incorporated into the NCO-prepolymers. They may be incorporated, for example, by the simultaneous use of compounds, having (i) at least one isocyanate-reactive group, preferably an alcoholic hydroxyl group and (ii) non-ionic hydrophilic polyoxyethylene units. Structural constituents of this type are, for example, described in U.S. Pat. Nos. 3,905,929, 4,190,566, 4,237,264 or 4,238,378. Likewise, it is of course possible to use hydrophilically modified polyisocyanates as further polyisocyanate components in addition to the above-mentioned polyisocyanates which are not hydrophilically modified, such as the polyisocyanates which are described in U.S. Pat. No. 3,920,598 or polyisocyanates, as may be obtained by reacting excess quantities of the previously discussed organic polyisocyanates with the above-mentioned hydrophilic structural components having isocyanate-reactive groups.

In preparing the NCO-prepolymers an equivalent ratio of isocyanate groups to isocyanate-reactive groups of about 1.2:1 to 5:1, preferably about 1.5:1 to 3:1, is generally maintained, while a temperature of about 20° to 150° C., preferably about 60° to 130° C., is used. From the above equivalent ratios of the reaction constituents it is understood that with regard to the present invention the term "NCO-prepolymers" is to be understood to include so-called "semi prepolymers", i.e. mixtures of true prepolymers with excess quantities of starting isocyanates.

When carrying out the process according to the invention the polyisocyanate component may be used in a partially blocked form. Suitable blocking agents include lactams such as ε-caprolactam; oximes such as acetone oxime, methylethylketone oxime (butanone oxime) and cyclohexanone oxime; C-H-acidic compounds such as malonic acid diethylester, acetoacetic acid ethylester and acetylacetone; alcohols such as the monoalcohols having from 1 to 4 carbon atoms, 2-ethylhexanol, ethylene glycol monoethylether and diethylene glycol monoethylether; phenols such as phenol, cresol and xylenol; and heterocyclic compounds such as triazoles, imidazolines, imidazoles and tetrahydropyrimidines. The above blocking agents can be used alone or in the form of mixtures. ε-caprolactam, butanone oxime and malonic acid diethylester are preferred blocking agents.

The partial blocking of the polyisocyanate components used in the process according to the invention, and the formation of the NCO-prepolymers may take place in the presence or absence of solvents such as acetone, methylethyl ketone, acetic acid ethylester, acetic acid butylester, toluene, xylene and/or aliphatic hydrocarbon solvents. The blocking reaction is generally carried out at a temperature of up to about 150° C., preferably at about 60° to 120° C. When using partially blocked NCO-prepolymers as the polyisocyanate component, partial blocking generally takes place simultaneously with or subsequent to the production of the NCO-prepolymers.

The polyisocyanate component used in the process according to the invention generally has a total content of free and blocked isocyanate groups (calculated as NCO, molecular weight=42, based on the total weight of the polyisocyanate component including the blocking agent) of about 1 to 25%, preferably about 2 to 15%, by weight and a content of free isocyanate groups, based on the total weight of the polyisocyanates including the blocking agent which may be present, of about 1 to 20%, preferably about 1 to 12%, by weight. The NCO functionality of the polyisocyanates which may be partially blocked, i.e., the number of free isocyanate groups which as a statistical average are present per molecule in the optionally partially blocked polyisocyanate, is generally from about 0.3 to 3. When using tert. amines which are essential to the invention and contain two or more hydroxyl groups, the NCO functionality is preferably below 2, for example from about 0.5 to 1.8, in order to complete the formation of high-molecular polyurethane. When the preferred NCO-prepolymers are used the free NCO functionality can be adjusted by the type (functionality) of starting polyisocyanates and polyhydroxyl compounds, by the quantity ratios thereof and also by suitable choice of the quantity of blocking agent. There are generally from 0.2 to 3 blocked isocyanate groups per free isocyanate group in the partially blocked polyisocyanates.

The first stage of the process according to the invention, that is the reaction of the polyisocyanates which may be partially blocked with the tert. amines having hydroxyl groups and corresponding to the formula

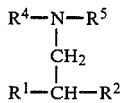

can take place in substance or in the presence of suitable solvents such as those previously mentioned at about 20 to 120, preferably about 60° to 120° C. The quantity ratios of the reaction constituents generally correspond to an NCO/OH equivalent ratio of about 0.7:1 to 2.5:1, preferably about 0.9:1 to 1.5:1 and in particular about 1:1 to 1.2:1, based on the free isocyanate groups of the polyisocyanate component and the hydroxyl groups of the tert. amines. Any free isocyanate groups which may still be present in the intermediate products thus obtained react with the water during the subsequent dissolving or dispersing stage with chain lengthening. An equivalent ratio below 1:1 is preferably only used when tert. amines essential to the invention have at least 2 hydroxyl groups. An equivalent ratio of greater than 1.2:1 and more particularly of greater than 1.5:1 is used when a chain lengthening reaction with the water or, as described below, with other chain lengthening agents is desired.

Moreover, when carrying out the process according to the present invention, the type and quantity ratios of the reaction constituents are preferably selected in such a way that there are about 1 to 1.5, preferably about 1 to 1.2, blocked isocyanate groups for each tert. amino group in the oligourethanes formed as intermediate products.

The tert. amine nitrogen atoms are at least partially converted into quaternary or preferably ternary ammonium groups in the second stage of the process according to the present invention. This may be effected in known manner by quaternization using alkylating agents such as methyl iodide or dimethylsulphate; cycloalkylating agents such as cyclohexyl iodide; or aralkylating agents such as benzyl bromide at a temperature of from about 20° to 100° C. and preferably in solution in inert solvents of the type previously mentioned.

The preferred ternary ammonium groups are formed by the addition of an acid which neutralizes the tert. amino groups.

Suitable acids include any inorganic or organic acids having a pKa value of below 5 such as hydrochloric acid, nitric acid, phosphorous acid, phosphoric acid, amidosulphonic acid, formic acid, acetic acid, glycolic acid, lactic acid or chloroacetic acid. Organic acids which are compatible with the intermediate products having tert. amino groups or the solutions thereof in the solvents previously mentioned are preferably used.

According to a particularly preferred variation, the second stage of the process according to the present invention is carried out using equivalent quantities of an acid of the type mentioned by way of example. However, the use of an excess of acid should be avoided since cationic aqueous systems often tend to precipitate in the presence of foreign electrolytes.

The use of a deficit of acid, based on the tert. amino groups of the intermediate product, is conceivable in principle. The only important factor is that the degree of neutralization be calculated such that water-soluble or dispersible reaction products are obtained.

With the less preferred quaternization of the tert. amino nitrogen atoms, it is preferable to quaternize only some of the tert. amino groups present so that tert. amino groups which can be thermally split back into secondary amino groups are still present in the oligourethanes. The quantity of quaternizing agent is therefore selected in such a way that, on the one hand, a quantity of quaternary nitrogen atoms sufficient for the solubility or dispersibility thereof is present in the products of the process and, on the other hand, a quantity of "masked secondary amino groups", i.e. tert. amino groups, sufficient for cross-linking the products of the process is present.

The oligourethanes containing the salt groups are converted into aqueous solutions or dispersions by merely mixing the oligourethanes or the solutions thereof with water, optionally in the presence of solvents. When using high-boiling solvents, they remain in the aqueous solution or dispersion and often act as coalescing agents. Low-boiling solvents such as acetone may be removed from the aqueous system subsequent to the production thereof under vacuum. It is possible to operate without solvents, in particular if lower molecular weight low-viscosity oligourethanes are used. The viscosity of the oligourethanes to be dissolved or dispersed in water may be lowered if desired by gentle heating. Special mechanical devices capable of producing zones with a high shear gradient can optionally be used for homogeneous mixing with water.

As a function of the ion group content and the molecular weight of the oligourethanes, the systems according to the invention obtained in this manner are molecularly dispersed or colloidal solutions or dispersions whose solids form a discontinuous phase. The particle size of the solids present in dispersions of this type is generally less than about 0.001, preferably less than about 0.0002 mm. The quantity of the water used for dissolving or dispersing and the quantity of solvent which may remain in the solutions or dispersions is in general preferably calculated in such a manner that from 65 to 15% by weight solutions or dispersions are obtained. The quantity of solvent which may still be present in the solutions or dispersions is generally at most about 75% by weight, based on the quantity of water present in the solutions or dispersions.

According to a further, less preferred embodiment of producing the oligourethanes in the solutions or dispersions according to the present invention, the starting polyisocyanates which may be partially blocked are reacted with the tert. amines having hydroxyl groups while maintaining an equivalent ratio of free isocyanate groups to hydroxyl groups of about 1.1:1 to 5:1, preferably about 1.2:1 to 3:1, so as to produce oligourethanes that still contain substantial quantities of free isocyanate groups which may be chain-lengthened by reacting these free isocyanate groups with chain lengthening agents to form higher molecular weight oligourethanes according to the present invention. Suitable chain lengthening agents include the polyhydric alcohols mentioned above in (a) or diamines having a molecular weight of 60 to 400 such as ethylene diamine, hexamethylene diamine, isophorone diamine, 4,4'-diaminodicyclohexylmethane, 2,4- and/or 2,6-diaminotoluene or 4,4'-diaminodiphenylmethane. Hydrazine or hydrazine derivatives such as hydrazine hydrate, oxalic acid dihydrazide or adipic acid dihydrazide may also be used as chain lengthening agents. The chain lengthening reaction of the oligourethanes having isocyanate groups preferably takes place in solution in previously mentioned solvents at about 50° to 100° C. while maintaining an equivalent ratio of free isocyanate groups to isocyanate-reactive groups of about 0.8:1 to 1.2:1. Subsequent to the chain lengthening reaction the tert. amino groups which are present are at least partially converted into ternary or quaternary ammonium groups and the aqueous solutions or dispersions are produced in accordance with the above specifications.

According to a variant of this embodiment for producing the solutions or dispersions according to the present invention, the chain lengthening reaction of the oligourethanes having free isocyanate groups takes place using blocked chain lengthening agents of the type described, for example, in DE-OS No. 2,725,589, DE-OS No. 2,732,131 and in particular DE-OS No. 2,811,148. This means that the oligourethanes which have isocyanate groups are mixed for example with ketamines, oxazolidines or, more particularly, ketazines of the type described in the above publications in the absence of water and the mixtures thus obtained are thoroughly mixed with water. As a result polyamines, amino alcohols or hydrazine are formed from the ketimines, oxazolidines or ketazines (the above masked chain lengthening agents) under the hydrolytic influence of the water and react with the free isocyanate groups in a chain lengthening reaction. According to this variation the quantity of the blocked chain lengthening agents is also preferably calculated in such a manner that there are about 0.8 to 1.2 potential isocyanate-reactive groups for each free isocyanate group in the oligourethanes. Potential chain lengthening agents of the above-mentioned type which are only partially blocked can of course also be used such as compounds containing at most one aminic or hydrazinic amino group and at least one blocked aminic or hydrazinic amino group.

In this variant of producing the solutions or dispersions according to the present invention, the tert. amino groups may be partially converted into ternary ammonium groups while simultaneously thoroughly mixing the oligourethanes which have isocyanate groups with the blocked chain lengthening agents. This is done by mixing simultaneously the oligourethanes which have isocyanate groups with the blocked chain lengthening agents and with an acid such as acetic acid. By mixing systems of this type with water, the chain lengthening reaction of the oligourethanes and the formation of the solutions or dispersions of the chain-lengthened reaction products takes place in a single stage process.

According to a further embodiment which is also less preferred for producing the solutions or dispersions according to the present invention, the tert. amines which have hydroxyl groups are reacted with excess quantities of unblocked polyisocyanates, while maintaining for example an NCO/OH equivalent ratio of about 1.2:1 to 5:1, preferably about 1.5:1 to 3:1, so that reaction products having free isocyanate groups are obtained. The isocyanate groups are then blocked with previously mentioned blocking agents. The intermediate products thus obtained having blocked isocyanate groups and tert. amino groups are then converted into the solutions or dispersions as previously described.

It is preferred to use starting polyisocyanates which contain partially blocked isocyanate groups so that the oligourethanes of the invention which are dissolved or dispersed in water have a content of incorporated blocked isocyanate groups which is sufficient to provide self-cross-linking properties of the oligourethane. However, according to a less preferred embodiment of the process of the invention it is also possible to use starting polyisocyanates which do not contain blocked but only free isocyanate groups of the type exemplified hereinbefore so that the resulting oligourethanes do not contain blocked isocyanate groups. In such case the usual polyisocyanates containing blocked isocyanate groups are added to the systems to guarantee the cross-linking properties of the aqueous binders of the invention.

Suitable organic polyisocyanates having blocked isocyanate groups may simply be obtained by blocking all isocyanate groups of the polyisocyanates exemplified hereinbefore using the blocking agents which have been exemplified hereinbefore as well. Polyisocyanates containing blocked isocyanate groups which are particularly suitable are, for example, tris-(isocyanatohexyl)biuret or its mixtures with its higher homologs, tris-(isocyanatohexyl)-isocyanurate or its mixtures with its higher homologs or urethane-modified polyisocyanates such as the reaction product of 3 moles of 2,4- and optionally 2,6-diisocyanatotoluene with 1 mol of trimethylolpropane, provided, the isocyanate groups of these polyisocyanates are blocked with blocking agents such as $\epsilon$-caprolactam, cyclohexanone oxime, malonic acid diethylester or acetacetic acid ethyl ester.

According to this less preferred variation of the process of the invention the polyisocyanates having blocked isocyanate groups are added to the systems during or after the manufacture of the solutions or dispersions in accordance with the invention. It is preferred to add the blocked polyisocyanates to the oligourethanes containing tert. amino groups prior to the conversion of these groups into quaternary or ternary ammonium groups.

According to all embodiments for producing the solutions or dispersions according to the present invention, the dissolved or dispersed oligourethanes have (a) a content of ternary or quaternary ammonium groups (calculated as nitrogen, atomic weight=14) of about 0.1 to 3, preferably about 0.3 to 2% by weight, (b) a content of tert. amine nitrogen atoms (calculated as nitrogen, atomic weight=14) of up to about 2.8, preferably up to about 1.8% by weight, and (c) a content of blocked isocyanate groups (calculated as NCO, molecular weight=42) of about 0 to 15, preferably about 0.5 to 15 and most preferably of about 1 to 10% by weight.

Further, the type and quantity ratios of the starting materials for producing the oligourethanes are preferably selected so that the oligourethanes contain ternary or quaternary ammonium groups (a), tert.amino groups (b) and blocked isocyanate groups (c) in an equivalent ratio of (a+b):c of about 1:1 to 1:1.5. The presence of quaternary ammonium groups in the oligourethanes is less preferred and, therefore, the tert. amino groups and/or ternary ammonium groups should be present so that the oligourethanes can still be thermally cross-linked. This capacity for thermal cross-linking is generally provided by the simultaneous presence of blocked isocyanate groups on the one hand and tert. nitrogen atoms and/or ternary ammonium groups on the other hand in an equivalent ratio of NCO:N of about 1:1 to 1.5:1, preferably about 1:1 to 1.2:1. If starting polyisocyanates which do not contain blocked isocyanate groups are used the amount of blocked polyisocyanates which are added to the systems is selected so that the molar ratio of (a+b):blocked isocyanate groups is within the same limits. It is, of course, also possible to guarantee the cross-linking properties of the systems by both incorporating blocked polyisocyanate groups into the oligourethanes and by adding blocked polyisocyanates to the systems, provided, that the overall ratio between the reactive groups (a+b and blocked isocyanate groups) is within the limits.

The ammonium groups or amino nitrogen atoms mentioned under (a) and (b) are terminal when using tertiary amines essential to the invention having only one hydroxyl group, but are incorporated within the molecule when using tertiary amines having two or more hydroxyl groups. In accordance with the above information with respect to the NCO/OH equivalent ratio and the functionality of the starting materials, the term "oligourethanes" covers mixtures of lower molecular weight oligourethanes having excess partially blocked polyisocyanates and higher molecular weight "oligourethanes" which would be better described as "polyurethanes" and which are obtained if at least difunctional polyisocyanates are reacted with at least difunctional tert. amines and optionally at least difunctional chain lengthening agents using about equivalent quantities of the starting materials. This, however, is less preferred.

Solutions or dispersions which are particularly preferred according to the present invention are those whose oligourethanes have (a) a content of ternary ammonium groups of about 0.5 to 1.5% by weight, (b) a content of tert. amine nitrogen atoms of up to about 1.3% by weight, and (c) a content of blocked isocyanate groups of about 1.5 to 8% by weight, provided that the equivalent ratio of the blocked isocyanate groups to the ternary ammonium groups and the tert. amino groups is about 1:1 to 1.5:1, preferably about 1:1 to 1.2:1.

The solutions or dispersions according to the present invention may be used as coating agents for any heat-resistant substrates optionally after the addition of auxiliaries and additives conventional in lacquer technology such as pigments, fillers, flowing agents and/or matting agents. These coating agents are applied to the substrates to be coated by methods known in lacquer technology such as by spraying, rolling, immersing or doctoring. After evaporation of the water or water-solvent mixture, films are observed which are generally still flexible, sometimes even tacky. However, rigid films which are free from tackiness and also withstand attack by polar solvents are obtained after heating for up to about 30 minutes at about 90° to 160° C., preferably at about 110° to 130° C. It follows that a reaction temperature above 90° C. and more particularly above 100° C. may only be exceeded temporarily during production of the oligourethanes according to the present invention to avoid a premature cross-linking reaction.

According to a particularly preferred embodiment of use according to the present invention, the above-mentioned coating agents are applied by cathodic electrodeposition to electrically conductive, preferably metallic substrates. Two electrodes of which one (cathode) represents the substrate to be coated are preferably arranged in an aqueous immersion bath having a solids content of from about 8 to 20% by weight. When using a metal vessel, it may be used as a second electrode (anode). When a direct current voltage of about 100 to 300 V is applied, a thick resin film is deposited on the substrate within a period of about 1 to 3 seconds. The thickness of the coating on completion of the deposition which is self-terminating and after subsequent rinsing and drying, is about 0.025 to 0.1 mm. As described above, the above flexible film which is sensitive to solvents is converted into a rigid lacquer coating which is free from tackiness and is resistant to the effects of solvents by brief heating at about 90° to 160° C., preferably at about 110° to 130° C.

After the tert. amine nitrogen atoms or ternary ammonium groups originally present in the oligourethanes are converted during this cross-linking reaction into neutral urea groups (reaction of the secondary amino groups with isocyanate groups), the basic centers in the lacquer films are no longer present. The basic centers could catalyze a hydrolysis of any ester groups which may be present under the influence of atmospheric moisture. It is therefore possible to incorporate structural components having ester groups into the lacquer films via the intermediate stage of the oligourethanes which are used as binders (use of polyester polyols during the production of the NCO prepolymers) without having to fear a susceptibility to hydrolysis in the resultant lacquer films.

In comparison with other electro-immersion lacquers of prior art, for example those whose binders are based on epoxide resins and blocked polyisocyanates and for which stoving temperatures of about 160° to 180° C. are required, the systems according to the present invention are distinguished by a comparatively low stoving temperature. It is obvious that a reduction in temperature of at least 30° C. during the stoving process and in particular when lacquering large metal articles, such as car bodies, represents a considerable reduction in the energy consumed during stoving.

In the following Examples, "parts" refers to parts by weight and/or percentages to percentages by weight.

EXAMPLES

EXAMPLE 1

165 parts of a polyether of bisphenol A and polyether having an OH number of 200, 200 parts of a polypropylene glycol having an OH number of 112 and 90 parts of a polyether based on trimethylol propane and propylene oxide having an OH number of 370 were dewatered under vacuum at 100° C. and, after cooling to 70° C., were mixed with 209 parts of a mixture of 2,4- and 2,6-diisocyanato-toluene (weight ratio=80:20) and stirred until the NCO content had dropped to 4.9%. The prepolymer having isocyanate groups which was thus obtained was mixed with 34 parts of ε-caprolactam and stirred at 70° C. until the NCO content was 2.7%. The partially blocked NCO prepolymer was then diluted with this 300 parts of acetone. 40 parts of an adduct from 1 mol of diethanol amine and 1 mol of acrylonitrile were then introduced into this solution. The solution was stirred under reflux until only traces of free isocyanate groups could be detected by IR spectroscopy. After addition of 13.2 parts of acetic acid, 1127 parts of water were slowly added with thorough stirring. After removal of the acetone by distillation, a white 40% solids pure dispersion which was not very finely divided was obtained. The dispersed oligourethane has a ternary ammonium group content of 0.41%, a tertiary amine nitrogen content of 0.06% and a blocked isocyanate group content (calculated as NCO) of 1.68%. The equivalent ratio of the above-mentioned nitrogen-containing groups to the isocyanate groups was 1:1.2.

Some of this dispersion was diluted with water to a solids content of 10% and introduced into an open metal vessel in which a bonderized steel plate was immersed. The metal vessel and steel plate were connected to a direct current source such that the vessel was connected to the positive pole and the plate to the negative pole thereof. A direct current was passed through the bath for 1 minute from the direct current source, the output voltage of which was adjusted to 300 V. The steel plate was then removed from the bath and rinsed with water. A white film which could not be mechanically charged had formed on both sides of the plate. After drying for 10 minutes at 60° C., the film was stoved for 30 minutes at 130° C. The resultant film was clear and lustrous and had good hardness and a thickness of 0.065 mm.

EXAMPLE 2

664 parts of the isocyanate prepolymer from Example 1 were mixed with 45 parts pf ε-caprolactam and stirred at 70° C. until the NCO-content was 2.2%. The partially-blocked NCO-prepolymer was then diluted with 312 parts of acetone. 58 parts of an adduct from 1 mol of N-methylethanol amine and 1 mol of acrylic amide were introduced into this solution and the solution was stirred under reflux until only traces of free isocyanate groups could be detected by IR-spectroscopy. After the addition of 13.2 parts of acetic acid, 1,449 parts of water were slowly introduced with thorough stirring. After the acetone had been removed by distillation, a white dispersion having 35.8% solids and which was not very finely-divided was obtained. The dispersed oligourethane had a ternary ammonium group content of 0.39%, a tert. amine nitrogen atom content of 0.32% and a blocked isocyanate group (calculated as NCO) content of 2.15%. The equivalent ratio of the above-mentioned nitrogen-containing groups to the isocyanate groups was 1:1.

A wet film of about 0.1 mm in thickness was applied to an untreated steel plate and was dried for 1 hour at room temperature. After allowing it to dry for a further 10 minutes at 60° C. a flexible, non-adhesive coating was obtained which could be dissolved with acetone. A dry, non-adhesive lacquer coating which could not be dissolved with acetone was obtained after 60 minutes stoving at 120° C.

EXAMPLE 3

664 parts of the isocyanate prepolymer from Example 1 were mixed with 26 parts of butanone oxime and stirred at 70° C. until the NCO content was 3.05%. The partially-blocked NCO-prepolymer was then diluted with 297 parts of acetone. 40 parts of an adduct from 1 mol of diethanol amine and 1 mol of acrylonitrile were introduced into this solution; the solution was stirred under reflux until only traces of free isocyanate groups could be detected by IR-spectroscopy. After the addition of 13.2 parts of acetic acid, 1,115 parts of water were slowly introduced with thorough stirring. After the acetone had been removed by distillation, a white dispersion having a solids content of 40% was obtained. The dispersed oligourethanes had a ternary ammonium group content of 0.41%, a tert. amine nitrogen atom content of 0.06% and a blocked isocyanate group content (calculated as NCO) of 1.69%. The equivalent ratio of the above-mentioned nitrogen-containing groups to the isocyanate groups was 1:1.2.

According to the method in Example 1, a film was produced and dried on a bonderized steel plate. After heating at 110° C. over a period of 1 hour, a dry, non-adhesive film was obtained which was resistant to the effects of acetone and had a thickness of 50 μm.

EXAMPLE 4

664 parts of the isocyanate prepolymer from Example 1 were mixed with 26 parts of butanone oxime and stirred at 70° C. until the NCO content was 3.0%. The partially-blocked NCO-prepolymer was diluted with 299 parts of acetone. Then 44 parts of an adduct from 1 mol of diethanol amine and 1 mol of acrylamide were introduced into the solution and the solution was stirred under reflux until only traces of free NCO-groups could be detected by IR-spectroscopy. After addition of 13.2 parts of acetic acid, 1,743 parts of water were slowly introduced with thorough stirring. After the acetone had been removed by distillation, a blue-white, finely divided dispersion having 30% solids was obtained. The dispersed oligourethane had a ternary ammonium group content of 0.41%, an amine nitrogen atom content of 0.06% and a blocked isocyanate group content (calculated as NCO) of 1.7%. The equivalent ratio of the above-mentioned nitrogen-containing groups to the isocyanate groups was 1:1.2. A lacquer film was produced and dried on a bonderized steel plate according to the method in Example 1. After heating to 150° C. for a period of 1 hour, a dry, rigid, non-adhesive film was obtained which had a thickness of 75 μm and was resistant to the effects of acetone.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

EXAMPLE 5

220 parts of a polyether diol prepared by propoxylation of bisphenol A and having an OH number of 200 and 300 parts of polypropylene glycol having an OH number of 112 were dehydrated at 100° C. under vacuum. Subsequently 209 parts of a mixture of 2,4- and 2,6-diisocyanato-toluene (weight ratio=80:20) were added under stirring. Stirring was continued until the NCO content was 5.7%. Thereafter, 700 parts of acetone were added. 53 parts of an adduct of 1 mol of diethanol amine and 1 mol acrylonitrile were added. The resulting solution was stirred under reflux until the NCO content was 1.1%. Thereafter, 100 parts of a urethane-modified, blocked polyisocyanate prepared by reacting 134 parts of trimethylolpropane, 522 parts of 2,4-diisocyanato-toluene and 339 parts of ε-caprolactame were added. Finally, 18.0 parts of acetic acid and 1350 parts of water were added to the reaction mixture under stirring with subsequent removal of the acetone by distillation. A white dispersion having a solids content of 40% was obtained. The solids of this dispersion which consist of blocked polyisocyanate and an oligourethane of the invention which does not contain blocked isocyanate groups contains 0.48% of tertiary ammonium groups, 1.43% of blocked isocyanate groups (calculated as NCO). The equivalent ratio of tertiary ammonium groups to isocyanate groups is 1:1.

What is claimed is:

1. An aqueous solution or dispersion of cationic oligourethanes which are cross-linkable at elevated temperatures and which solutions or dispersions may contain blocked polyisocyanate groups wherein the oligourethanes contain
    (a) about 0.1 to 3% by weight of ternary or quaternary ammonium ions in the form of structural units which are incorporated via urethane groups terminally and/or within the oligourethane, corresponding to the formula

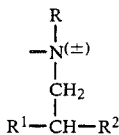

wherein
    R represents hydrogen or an aliphatic, cycloaliphatic or aralipathic radical obtained by quaternizing tert. nitrogen atoms with an alkylating, cycloalkylating or aralkylating agent,
    $R^1$ represents hydrogen or an alkyl radical having from 1 to 4 carbon atoms,
    $R^2$ represents —C≡N, —CO—NH$_2$, —CO—NHR$^3$, —CO—NR$_2^3$ or —COOR$^3$,
    $R^3$ represents a monovalent hydrocarbon radical which may have inert substituents,
    (b) up to about 2.8% by weight of tert. amine nitrogens in the form of structural units which are incorporated via urethane groups terminally and/or within the molecule, corresponding to the formula

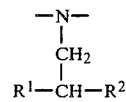

wherein $R^1$ and $R^2$ are as defined above and
    (c) about 0 to 15% by weight of blocked isocyanate groups provided that the ternary ammonium groups of (a), the tert. nitrogen atoms of (b) and the blocked isocyanate groups both incorporated into the oligourethane and being a part of the blocked polyisocyanate optionally present in the solution or dispersion are present in an equivalent ratio of (a+b):blocked isocyanate groups of about 1:1 to 1:1.5.

2. The aqueous solution or dispersion of claim 1 wherein the structural units set forth in (a) and (b) are incorporated by reacting
    (i) an organic polyisocyanate having partially blocked isocyanate groups and optionally urethane groups with a compound corresponding to the formula

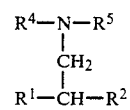

wherein
    $R^1$ and $R^2$ are as defined in claim 1 and
    $R^4$ and $R^5$ may be the same or different and represent hydrocarbon radicals having from 1 to 20 carbon atoms or hydrocarbon radicals having from 2 to 20 carbon atoms and at least one alcoholic hydroxyl group
    provided that at least one of the radicals $R^4$ or $R^5$ has at least one alcoholic hydroxyl group,
    at an equivalent ratio of free isocyanate groups to hydroxyl groups of about 0.7:1 to 2.5:1, and subsequently
    (ii) converting all or a portion of the tert. amine nitrogen atoms of the oligourethanes into ternary or quaternary ammonium groups by neutralization with an acid or by quaternization with an alkylating, cycloalkylating or aralkylating agent.

3. The aqueous solution or dispersion of claim 2 wherein said compound comprises the reaction product of 1 mol of diethanolamine and 1 mol of acrylonitrile.

4. A process for the production of an aqueous solution or dispersion of cationic oligourethanes which are cross-linkable at elevated temperature wherein the oligourethanes contain
    (a) about 0.1 to 3% by weight of ternary or quaternary ammonium ions in the form of structural units which are incorporated via urethane groups terminally and/or within the oligourethane, corresponding to the formula

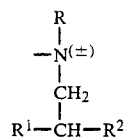

wherein

R represents hydrogen or an aliphatic, cycloaliphatic or araliphatic radical obtained by quaternizing tert. nitrogen atoms with an alkylating, cycloalkylating or aralkylating agent, $R^1$ represents hydrogen or an alkyl radical having from 1 to 4 carbon atoms, $R^2$ represents —C≡N, —CO—$NH_2$, —CO—$NHR^3$, —CO—$NR_2^3$ or —$COOR^3$, $R^3$ represents a monovalent hydrocarbon radical which may have inert substituents, (b) up to about 2.8% by weight of tert. amine nitrogens in the form of structural units which are incorporated via urethane groups terminally and/or within the molecule, corresponding to the formula

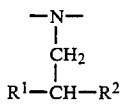

wherein $R^1$ and $R^2$ are as defined above and (c) about 0 to 15% by weight of blocked isocyanate groups provided that the ternary ammonium groups of (a), the tert. nitrogen atoms of (b) and the blocked isocyanate groups of (c) are present in an equivalent ratio of (a+b):c of about 1:1 to 1:1.5 which comprises reacting (i) an organic polyisocyanate having optionally partially blocked isocyanate groups and optionally urethane groups with a compound corresponding to the formula

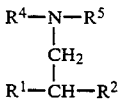

wherein $R^1$ and $R^2$ are as defined in claim 1 and $R^4$ and $R^5$ may be the same or different and represent hydrocarbon radicals having from 1 to 20 carbon atoms or hydrocarbon radicals having from 2 to 20 carbon atoms and at least one alcoholic hydroxyl group provided that at least one of the radicals $R^4$ or $R^5$ has at least one alcoholic hydroxyl group, at an equivalent ratio of free isocyanate groups to hydroxyl groups of about 0.7:1 to 2.5:1, and subsequently (ii) converting all or a portion of the tert. amine nitrogen atoms of the oligourethanes into ternary or quaternary ammonium groups by neutralization with an acid or by quaternization with an alkylating, cycloalkylating or aralkylating agent and (iii) dissolving or dispersing said oligourethanes in an aqueous medium either before, during or after step (ii), an organic polyisocyanate having blocked isocyanate groups being optionally added to the aqueous solution or dispersion during or after its production.

5. A process for the production of a coating on a heat-resistant substrate which comprises applying the aqueous solution or dispersion of claim 1 to said substrate and cross-linking the coating by heating to a temperature of up to about 160° C. with evaporation of the water.

6. The process of claim 5 wherein said substrate has a metallic surface and said coating is applied to said substrate by cathodic electrodeposition.

7. An aqueous solution or dispersion of cationic oligourethanes which are self cross-linking at elevated temperature wherein the oligourethanes contain (a) about 0.1 to 3% by weight of ternary or quaternary ammonium ions in the form of structural units which are incorporated via urethane groups terminally and/or within the oligourethanes, corresponding to the formula

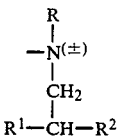

wherein

R represents hydrogen or an aliphatic, cycloaliphatic or araliphatic radical obtained by quaternizing tert. nitrogen atoms with an alkylating, cycloalkylating or aralkylating agent, $R^1$ represents hydrogen or an alkyl radical having from 1 to 4 carbon atoms, $R^2$ represents —C≡N, —CO—$NH_2$, —CO—$NHR^3$, —CO—$NR_2^3$ or —$COOR^3$, $R^3$ represents a monovalent hydrocarbon radical which may have inert substituents, (b) up to about 2.8% by weight of tert. amine nitrogens in the form of structural units which are incorporated via urethane groups terminally and/or within the molecule, corresponding to the formula

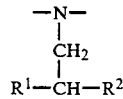

wherein $R^1$ and $R^2$ are as defined above and (c) about 0.1 to 15% by weight of blocked isocyanate groups provided that the ternary ammonium groups of (a), the tert. nitrogen atoms of (b) and the blocked isocyanate groups of (c) are present in an equivalent ratio of (a+b):c of about 1:1 to 1:1.5.

8. The aqueous solution or dispersion of claim 7 wherein the structural units set forth in (a) and (b) are incorporated by reacting (i) an organic polyisocyanate having partially blocked isocyanate groups and optionally urethane groups with a compound corresponding to the formula

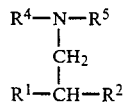

wherein $R^1$ and $R^2$ are as defined in claim 1 and $R^4$ and $R^5$ may be the same or different and represent hydrocarbon radicals having from 1 to 20 carbon atoms or hydrocarbon radicals having from 2 to 20 carbon atoms and at least one alcoholic hydroxyl group
provided that at least one of the radicals $R^4$ or $R^5$ has at least one alcoholic hydroxyl group,
at an equivalent ratio of free isocyanate groups to hydroxyl groups of about 0.7:1 to 2.5:1, and subsequently
(ii) converting all or a portion of the tert. amine nitrogen atoms of the oligourethanes into ternary or quaternary ammonium groups by neutralization with an acid or by quaternization with an alkylating, cycloalkylating or aralkylating agent.

9. The aqueous solution or dispersion of claim 7 wherein said compound comprises the reaction product of 1 mol of diethanolamine and 1 mol of acrylonitrile.

* * * * *